United States Patent
Agost et al.

(10) Patent No.: US 11,120,480 B2
(45) Date of Patent: Sep. 14, 2021

(54) SYSTEMS AND METHODS FOR REAL-TIME ONLINE TRAVELER SEGMENTATION USING MACHINE LEARNING

(71) Applicant: Amadeus S.A.S., Biot (FR)

(72) Inventors: Rodrigo Acuna Agost, Golfe Juan (FR); Alix Lheritier, Antibes (FR); Alejandro Ricardo Mottini D'Oliveira, Nice (FR); David Renaudie, Valbonne (FR)

(73) Assignee: AMADEUS S.A.S., Biot (FR)

( * ) Notice: Subject to any disclaimer, the term of this patent is extended or adjusted under 35 U.S.C. 154(b) by 545 days.

(21) Appl. No.: 15/704,428

(22) Filed: Sep. 14, 2017

(65) Prior Publication Data

US 2019/0080362 A1    Mar. 14, 2019

(51) Int. Cl.
| | | |
|---|---|---|
| G06Q 30/00 | (2012.01) | |
| G06Q 30/02 | (2012.01) | |
| G06Q 30/06 | (2012.01) | |
| G06N 99/00 | (2019.01) | |
| G06Q 10/02 | (2012.01) | |
| G06Q 50/14 | (2012.01) | |

(52) U.S. Cl.
CPC ......... *G06Q 30/0275* (2013.01); *G06Q 10/02* (2013.01); *G06Q 50/14* (2013.01)

(58) Field of Classification Search
CPC ..... G06Q 30/0275; G06Q 10/02; G06Q 50/14
USPC ...................................................... 705/14.71
See application file for complete search history.

(56) References Cited

U.S. PATENT DOCUMENTS

| | | |
|---|---|---|
| 7,594,189 B1 | 9/2009 | Walker et al. |
| 8,301,499 B2 | 10/2012 | Moissinac et al. |
| 8,442,863 B2 | 5/2013 | Chandramouli et al. |
| 8,494,897 B1 | 7/2013 | Dawson |
| 8,626,579 B2 | 1/2014 | Fordyce, III et al. |
| 8,626,697 B1 | 1/2014 | Chaine et al. |
| 8,655,695 B1 | 2/2014 | Qu et al. |

(Continued)

FOREIGN PATENT DOCUMENTS

| | | |
|---|---|---|
| CN | 101484890 A | 7/2009 |
| EP | 1223757 A2 | 1/2002 |

(Continued)

OTHER PUBLICATIONS

Faizan Shaikh, Why are GPUs necessary for training Deep Learning models?, May 18, 2017, Analytics Vidhya, https://www.analyticsvidhya.com/blog/2017/05/gpus-necessary-for-deep-learning/ (Year: 2017).*

(Continued)

*Primary Examiner* — Kambiz Abdi
*Assistant Examiner* — Dipen M Patel
(74) *Attorney, Agent, or Firm* — Thompson Hine LLP

(57) ABSTRACT

Methods and computing apparatus for real-time online traveler segmentation. A machine learning classifier may be trained using computed feature vectors and associated tags corresponding with records in a training set. A machine learning classifier receives a feature vector comprising values of the plurality of features corresponding with an unidentified user in an online context. The machine learning classifier may determine an estimate of whether the unidentified user is a member or a non-member of a predetermined traveler category.

11 Claims, 5 Drawing Sheets

(56) References Cited

U.S. PATENT DOCUMENTS

| | | | |
|---|---|---|---|
| 10,467,655 B1 | 11/2019 | Feldman et al. | |
| 10,565,622 B1* | 2/2020 | Burstein | G06Q 30/0266 |
| 2003/0229531 A1 | 12/2003 | Heckerman et al. | |
| 2005/0131762 A1 | 6/2005 | Bharat et al. | |
| 2008/0086558 A1 | 4/2008 | Bahadori et al. | |
| 2009/0070443 A1* | 3/2009 | Vanderhook | G06Q 30/02 709/222 |
| 2010/0030647 A1 | 2/2010 | Shahshahani | |
| 2010/0070373 A1 | 3/2010 | Zoeter | |
| 2010/0198772 A1 | 8/2010 | Silverman et al. | |
| 2011/0040636 A1* | 2/2011 | Simmons | G06Q 30/0243 705/14.71 |
| 2011/0054960 A1 | 3/2011 | Bhatia et al. | |
| 2011/0213655 A1 | 9/2011 | Henkin et al. | |
| 2011/0231264 A1* | 9/2011 | Dilling | G06Q 30/0251 705/14.71 |
| 2012/0023043 A1* | 1/2012 | Cetin | G06N 7/005 706/12 |
| 2012/0036023 A1* | 2/2012 | Das | G06Q 30/02 705/14.71 |
| 2012/0041816 A1 | 2/2012 | Buchalter | |
| 2012/0323687 A1 | 12/2012 | Schuster et al. | |
| 2013/0198188 A1 | 8/2013 | Huang et al. | |
| 2013/0254787 A1 | 9/2013 | Cox et al. | |
| 2013/0262226 A1 | 10/2013 | LaChapelle et al. | |
| 2014/0046777 A1* | 2/2014 | Markey | G06Q 30/02 705/14.66 |
| 2014/0143346 A1* | 5/2014 | Mahmud | G06Q 30/0201 709/206 |
| 2015/0134463 A1* | 5/2015 | Jalali | G06Q 30/0275 705/14.71 |
| 2015/0278970 A1* | 10/2015 | Valverde, Jr. | G06Q 30/0631 705/26.7 |
| 2015/0324857 A1* | 11/2015 | Siegel | G06Q 30/0269 705/14.64 |
| 2015/0339704 A1 | 11/2015 | Liu et al. | |
| 2016/0140587 A1* | 5/2016 | Wilson | G06Q 30/0204 705/7.33 |
| 2016/0180434 A1* | 6/2016 | Knight | G06Q 30/0641 705/26.63 |
| 2016/0292717 A1 | 10/2016 | Bhalgat et al. | |
| 2016/0371748 A1 | 12/2016 | Lidow et al. | |
| 2017/0103451 A1 | 4/2017 | Alipov et al. | |
| 2017/0220949 A1* | 8/2017 | Feng | G06N 20/00 |
| 2018/0025045 A1* | 1/2018 | Kirti | G06F 16/2365 707/690 |
| 2018/0253759 A1 | 9/2018 | Deng et al. | |
| 2018/0276578 A1* | 9/2018 | Otillar | G06N 20/00 |
| 2018/0300576 A1* | 10/2018 | Dalyac | G06K 9/6218 |

FOREIGN PATENT DOCUMENTS

| | | | |
|---|---|---|---|
| EP | 2874114 A1 | 11/2014 | |
| JP | 2016062411 A | 4/2016 | |
| WO | 2011020076 A2 | 2/2011 | |

OTHER PUBLICATIONS

Ta, A. (2015). Factorization machines with follow-the-regularized-leader for CTR prediction in display advertising doi:http://dx.doi.org/10.1109/BigData.2015.7364112 (Year: 2015).*

National Institute of Industrial Property, Preliminary Search Report issued in French Application No. 1758517 dated Mar. 16, 2018.

European Patent Office, International Search Report and Written Opinion issued in International Application No. PCT/EP2018/073838 dated Oct. 5, 2018.

National Institute of Industrial Property, Preliminary Search Report issued in French Application No. 1758514 dated Mar. 15, 2018.

European Patent Office, International Search Report and Written Opinion issued in International Application No. PCT/EP2018/073845 dated Oct. 22, 2018.

European Patent Office, International Search Report and Written Opinion issued in International Application No. PCT/EP2018/073841 dated Oct. 22, 2018.

McMahan et al., "Ad Click Prediction: a View from the Trenches", KDD '13, Aug. 11-14, 2013.

Chen et a., "XGBoost: A Scalable Tree Boosting System", KDD '16, Aug. 13-17, 2016.

Fotaki et al, "Exploring Big Data Opportunities for Online Customer Segmentation", International Journal of Business Intelligence Research (IJBIR) 5(3) Copyright: © 2014.

Breznitz et al., "A Strategic Advantage with Behavioral Targeting?", 35th DRUID Celebration Conference 2013, Barcelona, Spain, Jun. 17-19.

Rodrigo Acuno Agost et al., "Machine Learning Methods and Systems for Predicting Online User Interactions", U.S. Appl. No. 15/704,320, filed Sep. 14, 2017.

Rodrigo Acuno Agost et al., "Methods and Systems for Intelligent Adaptive Bidding in an Automated Online Exchange Network", U.S. Appl. No. 15/704,647, filed Sep. 14, 2017.

D. Li, G. Zhao, Z. Wang, W. Ma and Y. Liu, "A Method of Purchase Prediction Based on User Behavior Log," 2015 IEEE International Conference on Data Mining Workshop (ICDMW), Atlantic City, NJ, 2015, pp. 1031-1039, doi: 10.1109/ICDMW.2015.179.

Langtangen, "A Primer on Scientific Programming with Python", Springer 2014.

Chapelle et al., "Simple and Scalable Response Prediction for Display Advertising" ACM Transactions on Intelligent Systems and Technology, Dec. 2014 Article No. 61.

National Institute of Industrial Property, Preliminary Search Report issued in French patent application No. 1758516 dated Mar. 15, 2018.

USPTO, Office Action dated Jun. 23, 2020 in U.S. Appl. No. 15/704,647.

USPTO, Office Action dated Jan. 31, 2020 in U.S. Appl. No. 15/704,647.

USPTO, Office Action dated Oct. 17, 2019 in U.S. Appl. No. 15/704,647.

USPTO, Office Action dated Jun. 1, 2020 in U.S. Appl. No. 15/704,320.

USPTO, final Office Action dated Oct. 20, 2020 in U.S. Appl. No. 15/704,320.

USPTO, Office Action issued in U.S. Appl. No. 15/704,647 dated Dec. 15, 2020.

USPTO, Notice of Allowance dated Jan. 29, 2021 in U.S. Appl. No. 15/704,320.

A. Ta, "Factorization machines with follow-the-regularized-leader for CTR prediction in display advertising," 2015 IEEE International Conference on Big Data (Big Data), Santa Clara, CA, 2015, pp. 2889-2891.

USPTO, final Office Action dated Apr. 5, 2021 in U.S. Appl. No. 15/704,647.

* cited by examiner

SYSTEMS AND METHODS FOR REAL-TIME ONLINE TRAVELER SEGMENTATION USING MACHINE LEARNING

TECHNICAL FIELD

The present invention relates to machine learning models applied for classifying online users.

BACKGROUND

Online (e.g., web-based, mobile, or in-app) advertising differs from advertising in traditional media in its degree of personalized audience targeting. For example, while broadcast media advertising, such as television advertising, aims to reach a target demographic defined by broad characteristics such as age-group, socioeconomic status, and/or general interests, online advertising aims to reach individuals having a particular interest in the product, service, or information that is presented.

Highly personalized audience targeting technology has led to the development of business models that are specific to online advertising. For example, it is now common for websites that provide news, aggregated information, and other content of interest to particular users, to host third-party advertisements as a means for generating revenue. Advertisers whose advertisements appear on these websites may pay the operator on the basis of viewing opportunities or impressions (commonly measured as 'cost per thousand impressions', a.k.a. CPM), on the basis of a cost per click (CPC), or according to some other measure of performance. The actual selection of an advertisement to be placed on a web page presented to an individual user may be based, at least in part, on a bidding process whereby an advertiser who is willing to pay a higher CPM, CPC, or other cost measure, is more likely to have its advertisement presented to the user.

According to one common model, the bidding process is facilitated by an 'ad exchange platform'. An ad exchange is a technology platform that implements a digital marketplace allowing advertisers and publishers of web sites and other online content to buy and sell advertising space, often through real-time auctions.

An ad exchange maintains a 'pool' of ad impressions. Publishers contribute their ad impressions, e.g., available advertising slots embedded within web pages served to users, into the pool. Buyers can then bid for the impressions that they wish to purchase. Bidding decisions are often made in real time based on information such as the previous behavior of the user an ad is being served to, time of day, device type, ad position, and so forth. In practice, these bidding decisions must themselves be made very rapidly, e.g., in at most a few tens of milliseconds, using technology platforms commonly known as demand side platforms (DSPs). Since there is a real cost to the advertiser in purchasing impressions through an ad exchange, the performance of technologies and algorithms deployed in a DSP for assessing the potential 'value' of a user in order to make a bid decision may have a significant business impact.

Advertisers typically have significant information in their own databases regarding their customers/clients. For example, a supplier of travel booking services will have information on an individual client basis regarding such characteristics as frequency, duration, class, origin, and destination of travel. Collectively, this information may be used to define traveler categories, or market segments, such as 'frequent traveler', 'business traveler', 'luxury traveler', 'budget traveler', 'adventure travelers', and so forth.

Accordingly, if an online user presented via an ad exchange could be identified with a particular client within the travel booking service provider's database, it would be possible to select advertisements that are highly-targeted to the user's known travel interests and preferences, and/or their known market segment, and for the provider's DSP to bid aggressively to place these high-value ads.

In practice, however, the user information available via an ad exchange is insufficient to uniquely identify an individual user. Thus, while an advertiser may have the ability to individually distinguish its customers/clients within its own databases, online users must generally be regarded as unidentified. There is, in short, a missing link between the advertiser's offline customer data and the online user information.

One possible approach to assigning a market segment to an unidentified online user is simply to ask, e.g., to present the user with a query such as 'are you a frequent traveler?' The user's response can be saved, e.g., in association with a browser cookie or similar, such that it becomes available via the ad exchange during future access by the user of relevant ad-hosting content sources. However, this approach suffers from a number of problems, including the difficulty of presenting and receiving a response to the query, the possible negative impact of obtrusive requests for information on the user's perception of the advertiser, and the potential for users to misclassify themselves.

An alternative approach is to gather and store additional cumulative information about unidentified online users, again using a browser cookie or similar to track and maintain this information over time. In this way, it may become possible to link an online user to an individually distinguishable customer/client in the advertiser's database, enabling the rich data available regarding past customer behavior, preferences, and market segmentation to be employed to select highly targeted advertisements. However, there are many significant problems with this approach, including: the high volume of data that must be managed; the complexity of matching logic, i.e., availability, selection, and verification of information that may be used for matching, and the various ways in which the information may be combined to determine whether a match has been found; low coverage, i.e., a match may only be made for online users who are actually present in the advertiser's customer/client database, which may be a very small proportion of all online users; data privacy issues, i.e., various national laws and regulations limit the use of personal information held by companies for targeting and tracking of individuals, which strongly restrict the amount of usable data with explicit identification; and performance issues, i.e., it may not be possible to compute a match within a few tens of milliseconds, as required.

As a result, there is a need for real-time computer-implemented technologies, methods and systems that can be deployed within DSPs and that are able to make improved decisions regarding ad selection and bidding through ad exchanges. It would be highly beneficial to take advantage of the rich data available in an advertiser's database of individually distinguishable customer information, while using only the significantly more limited user information available via an ad exchange in an online context for the purpose of decision-making by a DSP. In order to meet technical requirements, and ensure that page load times are not unduly increased by the selection and bidding process, it may be necessary that a decision be made in no more than a few tens of milliseconds.

SUMMARY

Embodiments of the invention may classify unidentified users in real-time into one or more categories, or segments, using limited information that may be available about each user in the specific online context of travel search, information, and booking systems. The embodiments of the invention may be applied in online advertising systems, for example to select advertisements most suitable for presentation to a user, and/or to determine an appropriate bid price for a view or click-through of an advertisement presented to a user.

In embodiments of the invention, a method includes accessing at least one offline data store that contains records of prior travel bookings of a plurality of individually-distinguishable travelers, wherein each individually-distinguishable traveler is assigned an associated tag in the data store as a member or non-member of a predetermined traveler category based upon one or more prior travel bookings of the individually-distinguishable traveler, and determining a plurality of features associated with the predetermined traveler category. Each feature is selected such that a corresponding value thereof may be obtained for an unidentified user in an online context. The method further includes computing, for each record of a training set of records selected from the offline data store, a feature vector comprising corresponding values for the plurality of features, training a machine learning classifier using the computed feature vectors and associated tags corresponding with records in the training set, receiving, at a processor configured to execute the machine learning classifier, a feature vector comprising values of the plurality of features corresponding with the unidentified user in the online context, and determining, by the processor executing the machine learning classifier, an estimate of whether the unidentified user is a member or non-member of the predetermined traveler category.

Embodiments of the invention may employ rich data typically held by travel booking service providers in their offline client databases in order to 'tag' individually-distinguishable travelers according to predetermined categories, such as market segments. For example, an individual traveler may be tagged as a 'frequent traveler' based upon a number of trips taken over a predetermined period, such as a calendar year, as a 'business traveler' based upon a number or ratio of business trips taken, or as a 'luxury traveler' based upon an average cost of each trip taken. Generally, however, this level of detail is not available for an unidentified user in an online context. In a scenario, available online user information may be limited to characteristics of a single trip in the context that the user may currently be, or have recently been, researching that trip online. Embodiments of the invention may therefore advantageously determine a set of features (e.g., trip characteristics) that are available in the online context, and compute values of those features corresponding with offline records of prior travel bookings of individually-distinguishable, and tagged, travelers. The resulting feature vectors and associated classifications are then applied to train a supervised machine learning model which can subsequently be deployed, e.g., in a DSP, to make very rapid (e.g., 30 milliseconds or less) classification decisions in the online context.

While the number of features for which values may be obtained for an unidentified user in an online context is relatively small, e.g., as few as between five and 10-20 features in some embodiments, it has surprisingly been found by the inventors that good performance can be achieved by the resulting machine learning classifier. For example, in a particular embodiment it has been found that just eight features may be used to achieve a true positive rate (TPR) of classification to a 'frequent travelers' segment (i.e., correct classification of frequent travelers) of 66%, with a false positive rate (FPR, i.e., non-frequent travelers classified incorrectly) of 22%. For this embodiment, the area under the receiver operating characteristic curve (AUROC) was found to be 0.80, which is generally regarded by those skilled in the art of machine learning as a good performance. An AUROC in excess of 0.80 was also achieved for a classifier trained using only five features to distinguish between 'business' and 'leisure' travel.

It will be appreciated that an individually-distinguishable traveler having records within the offline data store may be classified into a plurality of predetermined traveler categories, and that individual records may be associated with zero, one, or more categories. For example, a traveler may be tagged as a 'frequent traveler', a 'business traveler', and a 'luxury traveler', and may have associated records corresponding with both business trips and leisure trips for the purposes of training a machine learning classifier.

Furthermore, embodiments of the invention may employ one classifier, or multiple classifiers. For example, a multi-class classifier may be trained to select between mutually-exclusive categories, such as 'luxury traveler', 'mid-price traveler', and 'budget traveler', while one or more separate binary classifiers may be trained to classify an online user as a 'frequent traveler' and/or a 'business traveler'.

Accordingly, each individually-distinguishable traveler may be assigned a plurality of associated tags in the data store, each tag identifying the traveler as a member or non-member of a corresponding plurality of predetermined traveler categories based upon one or more prior travel bookings of the individually-distinguishable traveler. A distinct plurality of features may be associated with each one of the plurality of predetermined traveler categories, and the training action may comprise training one or more machine learning classifiers using computed feature vectors comprising values of the distinct plurality of features associated with each corresponding predetermined traveler category. The determining action may include executing, by the processor, each one of the machine learning classifiers to determine an estimate of whether the unidentified user is a member or non-member of each corresponding predetermined traveler category.

Preferably, the machine learning classifier is configured to generate a value corresponding with a level of confidence in the estimate of whether the unidentified user is a member or non-member of the predetermined traveler category. For example, the value may be an estimate of a probability that the unidentified user is a member of the category. A decision may be made based upon the estimate, for example by applying a threshold to the generated value. Where the value is an estimate of probability, the threshold may be set at 0.5.

According to an embodiment of the invention, the machine learning classifier is implemented as a gradient boosting machine. Those skilled in the art of machine learning will appreciate, however, that other machine learning models may be employed in embodiments of the invention including, but not limited to, support vector machines (SVM), naïve Bayes classifiers, logistic regression classifiers, and neural networks.

In embodiments of the invention, a computing apparatus is provided which implements a demand side platform. The computing apparatus includes a processor, at least one memory device accessible by the processor, and a data communications interface operably associated with the processor. The memory device contains a body of program instructions including a machine learning classifier which is executable by the processor and configured to determine an estimate of whether an unidentified online user is a member or non-member of a predetermined traveler category based upon an input feature vector comprising values of a plurality of features. The classifier is trained using a training set of records of prior travel bookings of a plurality of individually-distinguishable travelers in which each individually-distinguishable traveler is tagged as a member or non-member of the predetermined traveler category based upon one or more prior travel bookings of the individually-distinguishable traveler. Each of the features is selected such that a corresponding value thereof may be obtained for the unidentified online user. The body of program instructions further include instructions which, when executed by the processor, cause the computing apparatus to receive, via the data communications interface, a bid request message including site and user information of the unidentified online user; compute, based upon the received site and user information, a feature vector comprising values of the plurality of features corresponding with the unidentified online user; execute the machine learning classifier using the computed feature vector as input, to obtain an estimate of whether the unidentified online user is a member or non-member of the predetermined traveler category; and determine a bid decision based upon the estimate.

According to embodiments of the invention, the bid decision may comprise a positive bid decision, or a negative bid decision. In the event that the bid decision is a positive decision, a corresponding bid price may be determined, and a bid response comprising the bid price may be transmitted. The bid price may be, for example, a fixed bid price, or may be a variable bid price that is computed in accordance with any suitable algorithm.

The above summary may present a simplified overview of some embodiments of the invention in order to provide a basic understanding of certain aspects of the embodiments of the invention discussed herein. The summary is not intended to provide an extensive overview of the embodiments of the invention, nor is it intended to identify any key or critical elements, or delineate the scope of the embodiments of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification and in which like reference numerals refer to like features, illustrate various embodiments of the invention and, together with the general description given above and the detailed description given below, serve to explain the embodiments of the invention.

DETAILED DESCRIPTION

Figure 1:
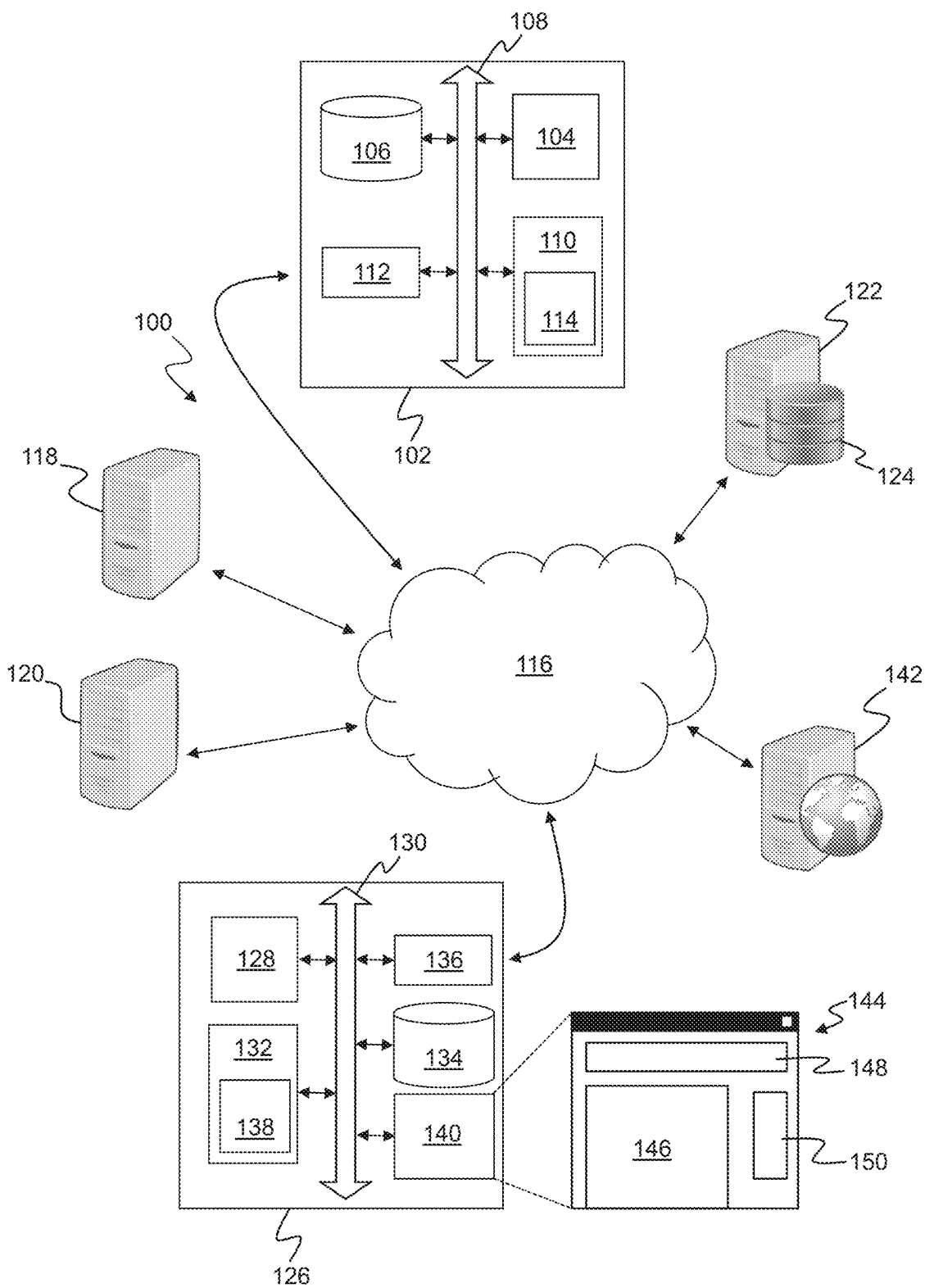
FIG. 1 is a schematic diagram illustrating an exemplary networked system in accordance with embodiments of the invention.

FIG. 1 is a block diagram illustrating an exemplary networked system 100 including a demand side platform (DSP) server 102, which is configured to implement a method of determining a bid for placement of advertising content in accordance with an embodiment of the invention. The DSP server 102 may comprise a computer system of a given architecture. In particular, the DSP server 102, as illustrated, comprises a processor 104 or more than one processor 104. The processor 104 is operably associated with at least one non-volatile memory/storage device 106, e.g., via one or more data/address busses 108 as shown. The non-volatile storage device 106 may be a hard disk drive, and/or may include a solid-state non-volatile memory, such as ROM, flash memory, solid-state drive (SSD), or the like. The processor 104 is also interfaced to volatile storage 110, such as RAM, which contains program instructions and transient data relating to the operation of the DSP server 102.

Figure 2:
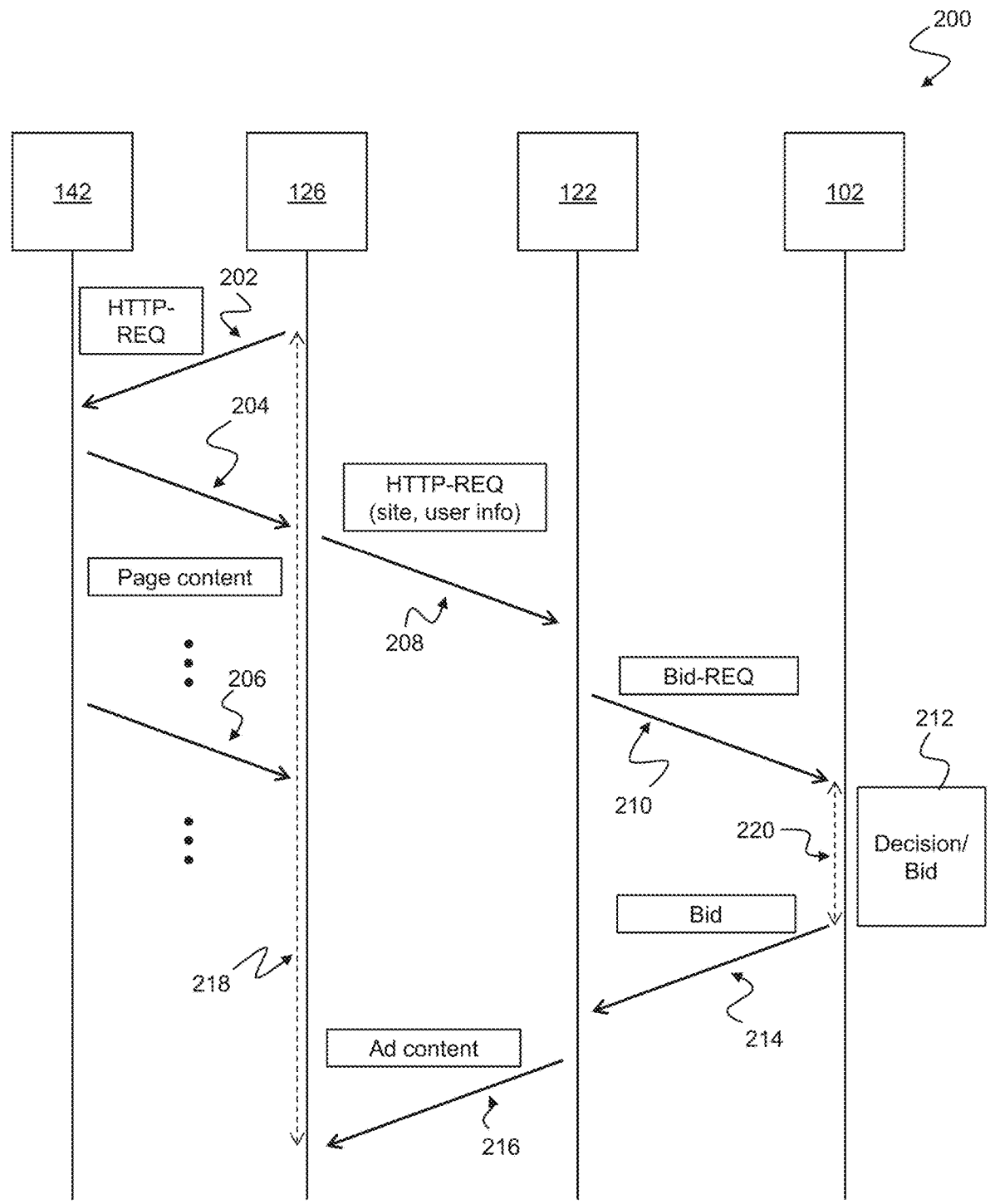
FIG. 2 shows a timeline of communications between a user device, a web server, an ad exchange server, and a DSP in accordance with embodiments of the invention.

The storage device 106 maintains program and data content relevant to the normal operation of the DSP server 102. For example, the storage device 106 may contain operating system programs and data, as well as other executable application software necessary for the intended functions of the authentication server 102. The storage device 106 also contains program instructions which, when executed by the processor 104, cause the DSP server 102 to perform operations relating to an embodiment of the present invention, such as are described in greater detail below, and with reference to FIGS. 2 and 5 in particular. In operation, instructions and data held on the storage device 106 are transferred to volatile memory 110 for execution on demand.

The processor 104 is also operably associated with a communications interface 112. The communications interface 112 facilitates access to a wide-area data communications network, such as the Internet 116.

In use, the volatile storage 110 contains a corresponding body of program instructions 114 transferred from the storage device 106 and configured to perform processing and other operations embodying features of the embodiments of the present invention.

With regard to the preceding overview of the DSP server 102, and other processing systems and devices described in this specification, terms such as 'processor', 'computer', and so forth, unless otherwise required by the context, should be understood as referring to a range of possible implementations of devices, apparatus and systems comprising a combination of hardware and software. This includes single-processor and multi-processor devices and apparatus, including portable devices, desktop computers, and various types of server systems, including cooperating hardware and software platforms that may be co-located or distributed. Physical processors may include general purpose CPUs, digital signal processors, graphics processing units (GPUs), and/or other hardware devices suitable for efficient execution of required programs and algorithms. Computing systems may include personal computer architectures, or other general-purpose hardware platforms. Software may include open-source and/or commercially-available operating system software in combination with various application and service programs. Alternatively, computing or processing platforms may comprise custom hardware and/or software architectures. For enhanced scalability, computing and processing systems may comprise cloud computing platforms, enabling physical hardware resources to be allocated dynamically in response to service demands. While all of these variations fall within the scope of the embodiments of the present invention, for ease of explanation and understanding the exemplary embodiments described herein are based upon single-processor general-purpose computing platforms, commonly available operating system platforms, and/or widely available consumer products, such as desktop PCs, notebook or laptop PCs, smartphones, tablet computers, and so forth.

In particular, the term 'processing unit' is used in this specification (including the claims) to refer to any suitable combination of hardware and software configured to perform a particular defined task, such as accessing and processing offline or online data, executing training actions of a machine learning model, or executing classification actions of a machine learning model. Such a processing unit may comprise an executable code module executing at a single location on a single processing device, or may comprise cooperating executable code modules executing in multiple locations and/or on multiple processing devices. For example, in some embodiments of the invention, classification and bid decision processing may be performed entirely by code executing on DSP server 102, while in other embodiments corresponding processing may be performed in a distributed manner over a plurality of DSP servers.

Software components, e.g., program instructions 114, embodying features of the invention may be developed using any suitable programming language, development environment, or combinations of languages and development environments, as will be familiar to persons skilled in the art of software engineering. For example, suitable software may be developed using the C programming language, the Java programming language, the C++ programming language, the Go programming language, and/or a range of languages suitable for implementation of network or web-based services, such as JavaScript, HTML, PHP, ASP, JSP, Ruby, Python, Perl, and so forth.

Returning to FIG. 1, the system 100 further comprises additional DSP servers, e.g., 118, 120 that, in use, compete with DSP server 102 to bid for placement of advertising content within online slots (i.e., for 'impressions') offered via an ad exchange server 122. The ad exchange server 122 implements a digital marketplace allowing advertisers and publishers of web sites and other online content to buy and sell advertising space in the form of a real-time, online auction in which each DSP server 102, 118, 120 is an automated, high-speed, bidder. The ad exchange server 122 comprises a database 124 in which it maintains details of online content providers (web servers) and advertisers (DSPs) for the purpose of operating a digital advertising marketplace.

The system 100 further includes user terminal devices, exemplified by terminal device 126. The terminal devices 126 may be, for example, desktop or portable PCs, smartphones, tablets, or other personal computing devices, and each comprise a processor 128 interfaced, e.g., via address/data bus 130, with volatile storage 132, non-volatile storage 134, and at least one data communications interface 136. The processor 128 is also interfaced to one or more user input/output (I/O) interfaces 140. The volatile storage 132 contains program instructions and transient data relating to the operation of the terminal device 126.

The terminal device storage 132, 134 may contain program and data content relevant to the normal operation of the device 126. This may include operating system programs and data (e.g., associated with a Windows, Android, iOS, MacOS, Linux, or other operating system), as well as other executable application software. The storage 132 also includes program instructions 138 which, when executed by the processor 128 enable the terminal device to provide a user with access to online content. For example, the program instructions 138 may implement a web browser having a graphical user interface (GUI) presented via the user I/O interface 140.

Accordingly, in the event that a user of the terminal device 126 access a web server 142, a corresponding web page display 144 is generated via the device UI 140. The web page display 144 include website content 146, and one or more advertising slots, e.g., 148, 150. A number of communications actions then take place in order to populate these slots, i.e., to provide online advertisers with ad impressions within the web page display 144. These communications actions will now be described with reference to the timeline 200 illustrated in FIG. 2.

Initially, the user terminal 126, via the executing web browser application 138 and responsive to user input, transmits 202 an HTTP request to the web server 142 which includes a URL of desired web content. The web server 142 responds by transmitting 204 content, e.g., a web page in HTML format, to the user device 126. The complete population and rendering of web page display 144 may require multiple requests and responses, and may involve further transactions with the web server 142 and/or with other online servers, such as content distribution network (CDN) servers and other web servers providing embedded content. For simplicity and to facilitate focus on communications embodying features of the present invention, all such known additional transactions are represented by a single exemplary communication 206 in FIG. 2.

In order to obtain advertising content to fill the slots 148, 150, the web page transmitted by the web server 142 to the user device 126 typically includes a hypertext reference ('href') directing the browser 138 to retrieve content from the ad exchange server 122 in accordance with an application programming interface (API) defined and provided by the relevant operator of the ad exchange server 122. Accordingly, the user device 126 transmits 208 an HTTP request to the ad exchange server 122. The request includes web site information and user information relating to the user of the terminal device 126. Available user information may include information that the web server 142 has gathered, and may include client-side information, such as device and browser identity and technical details, identifying information and contents of browser cookies, and the like.

The ad exchange server 122 receives the request, identifies relevant DSP servers 102, 118, 120 in its database 124, and transmits 210 bid request messages to each selected DSP server. One such bid request message, including site and user information, is received at DSP server 102 embodying the present invention, which executes a process 212 in accordance with its specific programming 114 in order to classify the user and arrive at a bid decision. In the event that a decision is made to bid for the offered impression, and a bid value determined, the DSP server 102 then transmits 214 the bid to the ad exchange server 122.

The ad exchange server 122 receives all bids transmitted from DSP servers, including server 102, and selects a winning bid. It then retrieves ad content corresponding with the winning bid from its database 124, and transmits 216 the ad content to the user device 126 for rendering within the corresponding ad slot, e.g., 148 or 150.

From a user's perspective, the speed to fully load a web page should not be excessive. For example, a load time that exceeds a few seconds, e.g., 3 seconds 218, may be considered excessive. There are, as has been described above, many actions necessary to fully serve all content of a complex web page, which may involve multiple servers across the global internet. Accordingly, the duration of the bidding process facilitated by the ad exchange server 122 should be limited. For example, the DSP server 102 should make a bid decision in no more than a few tens of milliseconds, for example in under 30 milliseconds 220. This decision may be made with limited user information, and in view of the fact that a bad decision may have significant consequences for the advertiser. For example, if the DSP server wrongly determines that the user is a desirable target for a particular ad (i.e., computes a 'false positive'), it may place a relatively high winning bid and incur a real cost with little or no prospect of any return. Conversely, if the DSP server wrongly determines that the user is not a desirable target for the ad (i.e., computes a 'false negative'), it may place no bid, or a low losing bid, and cause the advertiser to miss an opportunity to obtain an impression with a real prospect of a return.

In order to achieve quality decision-making at high speed in the context of travel booking services, embodiments of the present invention employ a machine learning approach. In particular, offline data, such as the contents of a client database containing detailed records of clients and travel bookings, may be used to classify travelers according to one or more market segments or categories. Without limitation, suitable categories or segments may include 'frequent traveler', 'business traveler', 'luxury traveler', 'budget traveler', and 'mid-range traveler'. Segments, and appropriate characteristics, may be determined according to an understanding of the market for travel services. For example, an individual traveler may be tagged as a 'frequent traveler' based upon a number of trips taken over a predetermined period, such as a calendar year, as a 'business traveler' based upon a number or ratio of business trips taken, or as a 'luxury traveler' based upon an average cost of each trip taken. With respect to the machine learning system disclosed herein, each travel booking record should be tagged with at least one category. The booking records and associated categories may then form the basis for training of a machine learning model embodying the invention.

Figure 3:
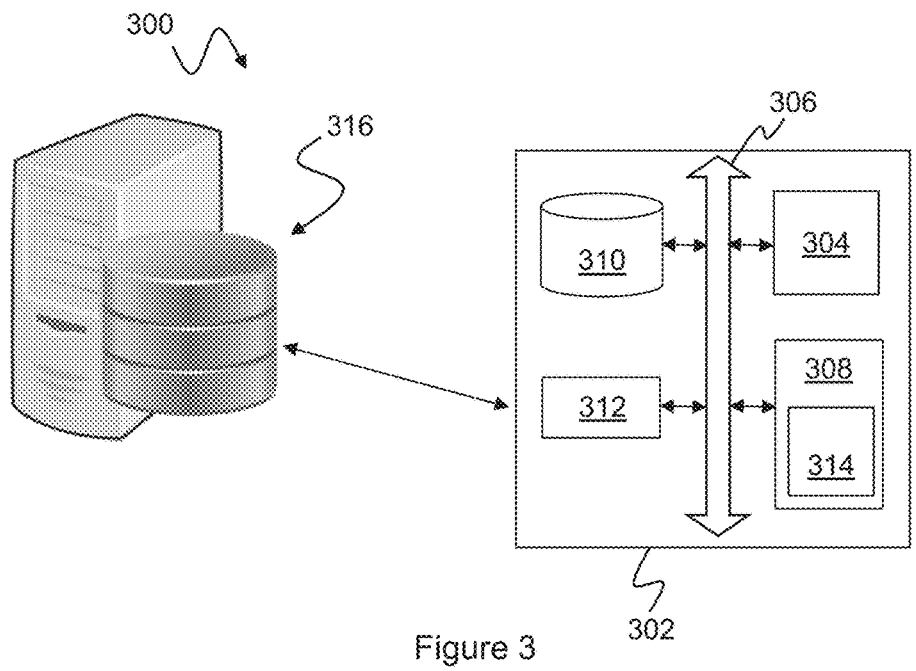
FIG. 3 is a schematic diagram illustrating a system for offline training of a machine learning model in accordance with embodiments of the invention.

FIG. 3 is a block diagram illustrating a system 300 for offline training of a machine learning model. The system 300 includes one or more high-performance computing system 302, preferably comprising hardware and/or software that is optimized for efficient execution of one or more machine learning models. Each computing system 302 comprises a central processor 304 interfaced, e.g., via address/data bus 306, with volatile storage 308, non-volatile storage 310, and at least one data communications interface 312. The computing system 300 may also include one or more GPUs (not shown), in view of the fact that certain machine learning models, such as neural network and deep learning models, are efficiently implemented using highly parallel, vectorized, algorithms for which GPUs are particularly well-suited. The volatile storage 308 contains program instructions and transient data relating to the operation of the computing system 302.

The computing system storage 308, 310 may contain program and data content relevant to its normal operation, which may include operating system programs and data (e.g., associated with a Windows, MacOS, Linux, or other operating system), as well as other executable application and/or system software. The storage 308 also includes program instructions 314 which, when executed by the processor 128 implement an offline training process for a machine learning model. In particular, travel booking records and associated categories may be retrieved from an offline database server 316, and employed for training of the machine learning model.

Figure 4:
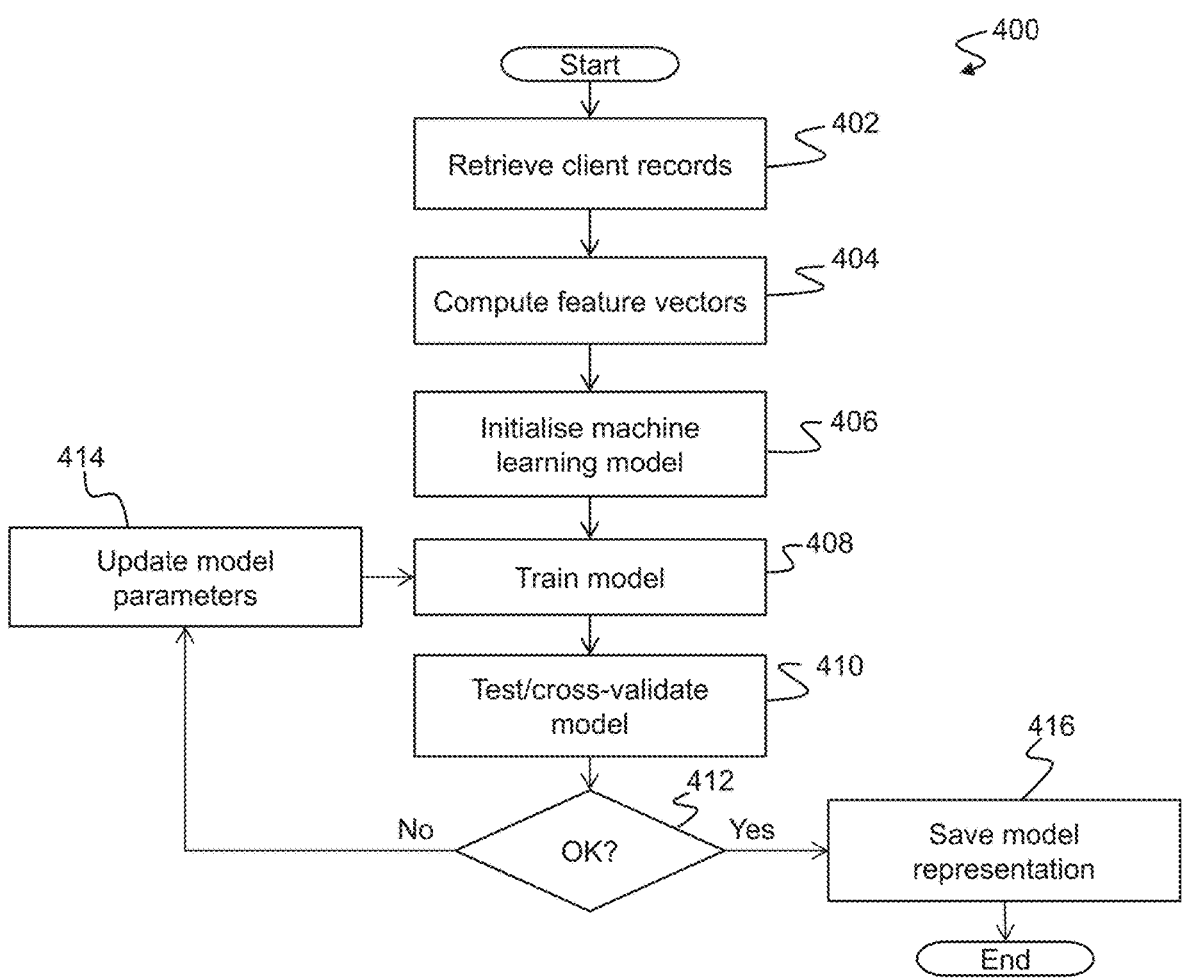
FIG. 4 shows a flowchart of a method of offline training in accordance with embodiments of the invention.

FIG. 4 is a flowchart 400 illustrating a method of offline training embodying the invention, such as may be implemented by the computing system 302. According to this method, at block 402 travel booking records and associated categories (which may alternatively be called 'tags', 'labels', 'classes', or 'classifications', depending upon context) are retrieved from the database 316. At block 404, a set of feature vectors is computed using the contents of the travel booking records. This action in the method has the effect of linking the detailed offline data corresponding with individually-distinguishable travelers available in the database 316 with the more limited unidentified user information that is available in the online context, i.e., as transmitted 210 to the DSP 102.

More particularly, a feature is an item of information (e.g., a numerical, categorical, or Boolean value) that can be derived from both the detailed offline data and the more-limited online data. For example, online data relevant to travel booking services and captured from an unidentified user's online activities relating to an actual or potential trip (e.g., based on search queries, booking site searches or enquiries, and/or actual online bookings) may include origin of travel, destination of travel, date of departure, date of arrival, and duration of trip. However, additional details that may be available in the offline database 316, such as traveler name, class of travel, cost of travel, traveler history, and so forth, are not generally available in the online context.

A feature vector is a set of the features derivable from both offline and online data that are collectively used for training of the machine learning model, and for subsequent online classification by the DSP server 102. Examples of feature vectors developed in accordance with embodiments of the invention are described further below, with reference to FIGS. 6 and 7.

At block 406, an untrained machine learning model is initialized. This action involves creation and initialization of data structures comprising the model, as well as the setting of relevant parameters/hyperparameters for the training process. It may also involve model selection, and in some embodiments the model may in fact combine multiple models (ensemble learning). At block 408, the computing system 302 executes one or more training procedures in accordance with the selected one or more machine learning algorithms. Training involves inputting at least a portion of the computed feature vectors and corresponding tags as a training set, and applying a training procedure adapted to minimize an objective function which reflects an accuracy of the trained model in classifying the feature vectors according to the known tags. Subsequently, at block 410, the trained model may be tested using a test set, and/or cross-validation set, which may, for example, comprise a portion of the computed feature vectors and corresponding tags held back from the training block 408 for this purpose.

Figure 6:
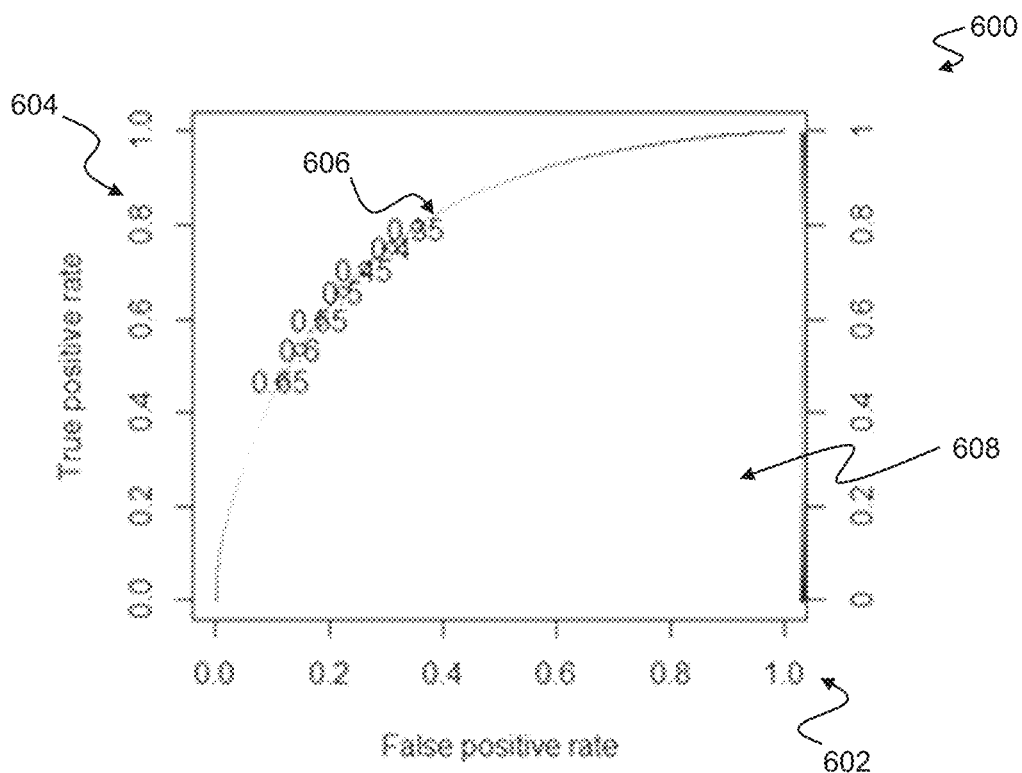
FIG. 6 is an exemplary receiver operating characteristic (ROC) curve for a frequent traveler classifier in accordance with embodiments of the invention.
Figure 7:
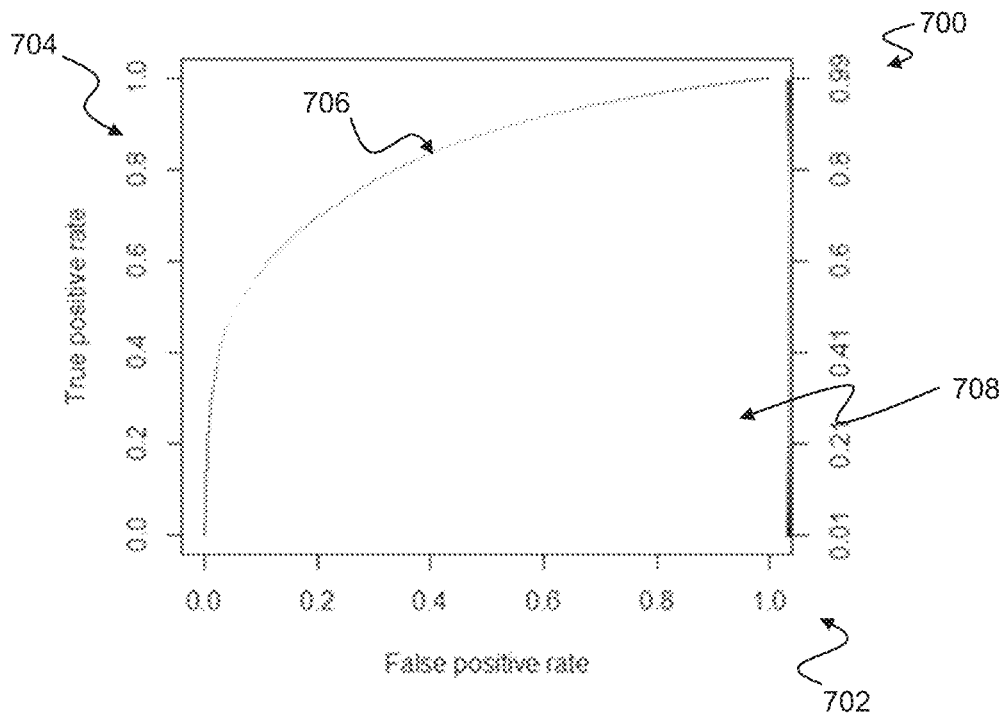
FIG. 7 is an exemplary ROC curve for a business traveler classifier in accordance with embodiments of the invention.

At decision block 412, the results of the test block 410 may be evaluated to determine whether they satisfy a suitable criterion of quality (examples of which are described below with reference to FIGS. 6 and 7). If not, then at block 414 the model parameters/hyperparameters may be updated and the model reinitialized for retraining at block 408. Alternatively, if the model is deemed to be of sufficient quality, a representation of the trained model is saved at block 416. This representation is suitable to be loaded and executed by the DSP server, as described below with reference to FIG. 5.

By way of example, in an embodiment of the invention, an eXtreme Gradient Boosting (XGBoost) machine learning model is employed. The XGBoost system is highly scalable, is widely-used and tested, and an efficient implementation in C/C++ is available as an open source package, with bindings to other languages used in technical computing such as Python, R and *Julia*. Results from this embodiment are presented below with reference to FIGS. 6 and 7.

Figure 5:
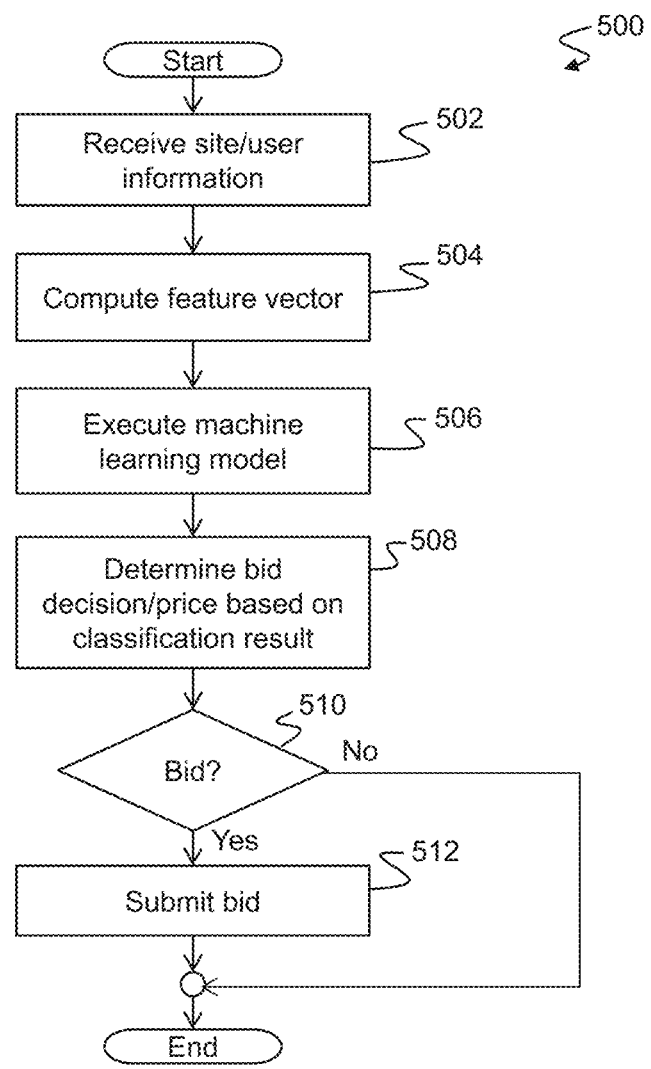
FIG. 5 shows a flowchart of a method of determining a bid decision by a DSP in accordance with embodiments of the invention.

Turing now to FIG. 5, there is shown a flowchart 500 of a method of determining a bid decision by DSP server 102. At block 502, site and unidentified user information is received, i.e., via transmission 210 from the ad exchange server 122. This information is used at block 504 to compute a feature vector, which is input to the machine learning model executed at block 506. In particular, this model execution is based on the representation saved at block 416 of the process 400. The output of the model is an estimate of the classification of the user based on the calculated feature vector which may be, in the case of the XGBoost algorithm for example, a generated numerical value representing a level of confidence in the estimate of whether the unidentified user is a member or non-member of the category for which the model was trained. For example, the value may be an estimate of a probability that the unidentified online user is a member of the category.

At blocks 508,510, a bid decision is made based upon the estimate. The decision may include determining whether or not to bid at all, and/or a determination of a particular price to bid for the available impression. For example, a threshold may be applied to the generated value, such that if the value is below the threshold then no bid is made. In some embodiments, a bid amount may be determined based upon the magnitude of the generated value, such that a higher price is bid if the model indicates a higher confidence in the classification of the unidentified user. In the event that a decision is made to bid for the impression, the bid information is transmitted 214 back to the ad exchange server 122 at block 512.

The use of a machine learning model as described above has a number of advantages, and addresses particular problems present in prior art approaches. Firstly, it overcomes limitations with linking of offline and online data. In particular, the machine learning model itself, which is trained on offline data and subsequently executed on online data, effectively becomes the means of linkage. Secondly, it is not relevant that the unidentified online users may not correspond with any of the customers/clients having records in the offline database. Accordingly, 100% of online users can be classified by the model, so long as the minimum information required to compute the feature vectors is available. Thirdly, the method and system avoid privacy constraints, because the stored representation of the trained machine learning model comprises data structures that contain no individually-identifiable personal data of any customer/client in the offline database. The information deployed to the DSP server 102 is thus wholly anonymized. Fourthly, although the training process may be highly computationally-intensive, requiring high-performance computing resources and extended time periods, the execution of the resulting trained model on a single feature vector can be extremely fast, easily satisfying the requirement to compute a decision in 30 milliseconds or less.

In order to illustrate the effectiveness of embodiments of the invention, a number of examples will now be described.

Example 1

For the purposes of classifying unidentified users as either 'frequent travelers' or 'not frequent travelers', the following set of features was developed: distance between origin and destination, number of days to departure, origin longitude, origin latitude, destination longitude, destination latitude, departure day-of-week (DOW), and arrival DOW.

A commercial database was employed for offline training, containing cleaned records in which individually-distinguishable travelers were reconciled with a total of 1,328,694 trips. Within this database, a 'frequent traveler' was defined as a person who took five or more trips in any 12 month period. Using this definition, 5.3% of trips in the data set were automatically tagged as 'frequent traveler' trips. An XGBoost model with 489 trees was trained using feature vectors comprising the above feature set, computed using the tagged trips. A resulting ROC curve 600 is shown in FIG. 6, wherein the horizontal axis 602 represents false positive rate (FPR), the vertical axis 604 represents true positive rate (TPR), and the ROC 606 is generated by sweeping the threshold between 0.0 and 1.0 at which the model output is determined to indicate a 'frequent traveler'. In this case, the AUROC 608 is 0.8, which compares with the value of 0.5 that would be obtained by making a purely random decision, and is regarded as good performance of the machine learning classifier. Using a decision threshold of 0.5, the TPR (correctly-classified frequent travelers) for this model is 66%, and the FPR (wrongly-classified non-frequent travelers) is 22%. The model may therefore be employed for bid decisions resulting in significantly better outcomes than pure chance.

Example 2

For the purposes of classifying unidentified users as either 'business travelers' or 'not business travelers' (i.e., 'leisure travelers'), the following set of features was developed: trip duration (number of days), departure DOW, arrival DOW, number of days to departure, and includes Saturday night (Boolean).

With regard to the available offline data for individually-distinguishable travelers (121,146 trips from the commercial database described above), 51.3% of examples were identified as business trips. An XGBoost model was again trained on feature vectors generated from this data set. A resulting ROC 700 is shown in FIG. 7, wherein the horizontal axis 702 represents FPR, the vertical axis 704 represents TPR, and the ROC 706 is generated by sweeping the threshold at which the model output is determined to indicate a 'business traveler' between 0.0 and 1.0. In this case, the AUROC 708 is 0.82, and again regarded as good performance of the machine learning classifier.

Example 3

For the purposes of classifying unidentified users as 'luxury travelers', 'budget travelers', or 'mid-range travelers', the following set of features was developed: origin city purchasing power parity (PPP) based per capita gross domestic product (GDP), origin country PPP-based per capita GDP, destination city PPP-based per capita GDP, destination country PPP-based per capita GDP, departure DOW, arrival DOW, includes Saturday night (Boolean), trip duration (number of days), time to departure (number of days), domestic trip (Boolean), and international trip (Boolean)

From an initial data set of over 50,000 examples, 4723 trips were selected that could be well-identified as 'luxury' or 'budget'. These trips comprised 3.15% and 5.84% of the total data set respectively, with all others (91.01%) considered 'mid-range. These 4723 examples were used to generate feature vectors comprising the above feature set in order to train a binary XGBoost model. The model was configured to produce an output estimate representing a level of confidence of whether a trip corresponding with an input feature vector is associated with a 'luxury traveler', on a scale of 0.0 to 1.0. The AUROC for this binary classifier was found to be 0.83.

Two thresholds were established for classifying unidentified online users into 'luxury', 'budget', and 'mid-range' categories. In particular, if the output estimate of the XGBoost classifier was less than 0.2, the user was classified as a 'budget traveler'; if the output estimate was greater than 0.8, the user was classified as a 'luxury traveler'; all other were classified as 'mid-range'. Using a test set including a full range of examples, the following confusion matrix was obtained.

|  |  | Prediction | | |
| --- | --- | --- | --- | --- |
|  |  | Budget | Luxury | Mid |
| Truth | Budget | 585 | 37 | 373 |
|  | Luxury | 70 | 190 | 268 |
|  | Mid | 5708 | 2503 | 7629 |

Thus, for example, 36% of 'luxury' cases were correctly predicted, with the majority of misclassifications (50% of 'luxury' cases) being assigned to 'mid-range, whereas 58.8% of 'budget' cases were correctly classified.

In summary, embodiments of the present invention provide systems and methods employing machine learning models to classify unidentified online users, using limited information, into different traveler categories using training data derived from offline databases containing records relating to individually-distinguishable travelers. In this way, the machine learning models effectively provide a 'smart' linkage between rich offline data and limited online data. The online users need not have been previously encountered by the system, and classification can be performed for any user so long as the minimum information required to compute the model feature vectors is available. The system protects privacy, in that no individually-identifiable personal data of any customer/client in the offline database is reflected in the deployed machine learning models. Once the model has been trained, classification on newly-observed online users can be extremely fast, e.g., 30 milliseconds or less.

Surprisingly, despite the very limited information available about unidentified users in the online context, with good model design in accordance with the principles of the embodiments of the invention, models with good predictive power can be developed. Predictions generated by the models can therefore be used with confidence for high-speed, real-time, online decision-making, such as in bidding for impressions within a digital advertising marketplace facilitated by an ad exchange server.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A computing system comprising a demand side platform (DSP) server, the DSP server comprising:
   one or more processors;
   at least one memory device coupled with the one or more processors; and
   a data communications interface operably associated with the one or more processors,
   wherein the memory device contains a plurality of program instructions including a machine learning classifier which is executable by the one or more processors and configured to determine an estimate of whether an unidentified user is a member or a non-member of a predetermined traveler category based upon an input feature vector comprising values of a plurality of features, the machine learning classifier having been:
   trained using a training set of records of prior travel bookings of a plurality of individually-distinguishable travelers, obtained from an offline data store, in which each individually-distinguishable traveler is tagged as a member or a non-member of the predetermined traveler category based upon one or more prior travel bookings of the individually-distinguishable traveler, the training set of records comprising computed feature vectors and corresponding tags associated with the plurality of individually-distinguishable travelers, the machine learning classifier has been trained on one or more high-performance computing systems comprising one or more graphics processing units (GPUs), and
   selected via a model selection process that entails a training procedure, wherein the training procedure involves:
      inputting the computed feature vectors and corresponding tags associated with the plurality of individually-distinguishable travelers,
      determining an accuracy in classifying the feature vectors according to the corresponding taps by applying a training procedure adapted to minimize an objective function, and
      selecting features, based on the determined accuracy that meet a criterion of quality, such that a corresponding value thereof may be obtained for the unidentified user, and a distinct plurality of the selected features are associated with each one of the plurality of predetermined traveler categories and based on the assigned associated tag of each individually-distinguishable traveler,
   wherein the plurality of program instructions, when executed by the one or more processors, cause the DSP server to:
      receive, via the data communications interface, a bid request message including website information and user information of the unidentified user, wherein:
         the website information and the user information is limited to characteristics of a single travel booking currently researched by the unidentified user for the bid request,
         the website information and the user information is wholly anonymized and does not include individually-identifiable personal data of the unidentified user, and
         the one or more processors configured to execute the trained and selected machine learning classifier have not encountered the unidentified user and associated user information before the bid request was received;
      in response to receiving the bid request message, determine, based upon the website information and the user information of the unidentified user, a plurality of features corresponding to the unidentified user;
      compute, based upon the website information and the user information of the unidentified user, a particular feature vector for the unidentified user comprising values of the plurality of features corresponding with the unidentified user;
      generate, by the trained and selected machine learning classifier using the computed particular feature vector as input, a confidence value corresponding with a level of confidence in an estimate of whether the unidentified user is a member or a non-member of the predetermined traveler category;

determine, based on the confidence value with respect to a confidence threshold, an estimate of whether the unidentified user is a member or a non-member of the predetermined traveler category;

determine, based on the estimate of whether the unidentified user is a member or a non-member of the predetermined traveler category, a bid decision; and determine, based on the bid decision and the confidence value, a bid amount that correlates to a magnitude of the confidence value.

2. The computing apparatus of claim 1 wherein the bid decision comprises a positive bid decision and a bid price, and the plurality of program instructions executed by the one or more processors further cause the computing apparatus to:

transmit, via the data communications interface, a bid response comprising the bid price.

3. The computing apparatus of claim 1 wherein the generated value is an estimate of probability that the online user is a member of the predetermined traveler category.

4. The computing apparatus of claim 1 wherein the trained and selected machine learning classifier is a gradient boosting machine.

5. A method comprising:

at a demand side platform (DSP) server having one or more processors:

accessing at least one offline data store that contains records of prior travel bookings of a plurality of individually-distinguishable travelers, wherein each individually-distinguishable traveler is assigned an associated tag in the offline data store as a member or a non-member of a predetermined traveler category based upon one or more prior travel bookings of the individually-distinguishable traveler, and a distinct plurality of features is associated with each one of the plurality of predetermined traveler categories;

determining a plurality of features associated with the predetermined traveler category, wherein each feature is selected such that a corresponding value thereof may be obtained for an unidentified user;

for each record of a training set of records selected from the offline data store, computing feature vectors comprising corresponding values for the plurality of features associated with each corresponding predetermined traveler category and based on the assigned associated tag of each individually-distinguishable traveler;

training, on one or more high-performance computing systems comprising one or more graphics processing units (GPUs), a machine learning classifier using the computed feature vectors and the associated tags corresponding with records in the training set, the machine learning classifier having been selected via a model selection process that entails a training procedure, wherein the training procedure involves:

inputting the computed feature vectors and corresponding tags associated with the plurality of individually-distinguishable travelers, determining an accuracy in classifying the feature vectors according to the corresponding tags by applying a training procedure adapted to minimize an objective function, and selecting features, based on the determined accuracy that meet a criterion of quality, such that a corresponding value thereof may be obtained for the unidentified user, and a distinct plurality of the selected features are associated with each one of the plurality of predetermined traveler categories and based on the assigned associated tag of each individually-distinguishable traveler;

receiving, at one or more processors configured to execute the trained and selected machine learning classifier, a bid request message including website information and user information of an unidentified user, wherein:

the website information and the user information is limited to characteristics of a single travel booking currently researched by the unidentified user for the bid request, the website information and the user information is wholly anonymized and does not include individually-identifiable personal data of the unidentified user, and the one or more processors configured to execute the trained and selected machine learning classifier have not encountered the unidentified user and associated user information before the bid request was received;

in response to receiving the bid request message, determining, by the one or more processors executing the trained and selected machine learning classifier, an estimate of whether the unidentified user is a member or a non-member of a predetermined traveler category, wherein the estimate is determined by:

determining, based upon the website information and the user information of the unidentified online user, a plurality of features corresponding with the online user;

computing, based upon the website information and the user information of the unidentified online user, a particular feature vector for the unidentified online user comprising values of the plurality of features corresponding to the unidentified online user;

generating, by the trained and selected machine learning classifier using the computed particular feature vector as input, a confidence value corresponding with a level of confidence in an estimate of whether the unidentified online user is a member or a non-member of the predetermined traveler category; and determining, based on the confidence value with respect to a confidence threshold, the estimate of whether the unidentified online user is a member or a non-member of the predetermined traveler category;

determining, based on the estimate of whether the unidentified online user is a member or a non-member of the predetermined traveler category, a bid decision; and determining, based on the bid decision and the confidence value, a bid amount that correlates to a magnitude of the confidence value.

6. The method of claim 5 wherein the predetermined traveler categories include 'frequent traveler', 'business traveler', 'leisure traveler', 'luxury traveler', 'budget traveler', 'mid-range traveler', or any combination thereof.

7. The method of claim 5 wherein the predetermined traveler category is 'frequent traveler', and the plurality of features are selected from the group consisting of distance between origin and destination, time to departure, origin longitude, origin latitude, destination longitude, destination latitude, departure day-of-week (DOW), arrival DOW, or any combination thereof.

8. The method of claim 5 wherein the predetermined traveler category is 'business traveler' and/or 'leisure traveler', and the plurality of features are selected from the group consisting of trip duration, departure day-of-week (DOW), arrival DOW, time to departure, an indicator of whether the trip includes a Saturday night, or any combination thereof.

9. The method of claim 5 wherein the predetermined traveler category is 'luxury traveler', 'budget traveler' and/or 'mid-range traveler', and the plurality of features are selected from the group consisting of origin city purchasing power parity (PPP) based per capita gross domestic product (GDP), origin country PPP-based per capita GDP, destination city PPP-based per capita GDP, destination country PPP-based per capita GDP, departure DOW, arrival DOW, an indicator of whether a trip includes a Saturday night, trip duration, time to departure, an indicator of whether the trip is a domestic trip, an indicator of whether the trip is an international trip, or any combination thereof.

10. The method of claim 5 wherein the trained and selected machine learning classifier comprises a gradient boosting machine.

11. A non-transitory computer readable storage medium at a demand side platform (DSP) server having one or more processors and comprising program code on the non-transitory computer readable storage medium, the program code including instructions that, when executed by the one or more processors, cause the one or more processors to:

implement a machine learning classifier configured to determine an estimate of whether an unidentified user is a member or a non-member of a predetermined traveler category based upon an input feature vector comprising values of a plurality of features, wherein determining the estimate is based on the machine learning classifier having been:

trained using a training set of records of prior travel bookings of a plurality of individually-distinguishable travelers, obtained from an offline data store, in which each individually-distinguishable traveler is tagged as a member or a non-member of the predetermined traveler category based upon one or more prior travel bookings of the individually-distinguishable traveler, the training set of records comprising computed feature vectors and corresponding tags associated with the plurality of individually-distinguishable travelers, wherein the machine learning classifier has been trained on one or more high-performance computing systems comprising one or more graphics processing units (GPUs), and selected via a model selection process that entails a training procedure, wherein the training procedure involves:

inputting the computed feature vectors and corresponding tags associated with the plurality of individually-distinguishable travelers, determining an accuracy in classifying the feature vectors according to the corresponding tags by applying a training procedure adapted to minimize an objective function, and selecting features, based on the determined accuracy that meet a criterion of quality, such that a corresponding value thereof may be obtained for the unidentified user, and a distinct plurality of the selected features are associated with each one of the plurality of predetermined traveler categories and based on the assigned associated tag of each individually-distinguishable traveler, receive a bid request message including website information and user information of the unidentified user, wherein:

the website information and the user information is limited to characteristics of a single travel booking currently researched by the unidentified user for the bid request, the website information and the user information is wholly anonymized and does not include individually-identifiable personal data of the online user, and the one or more processors configured to execute the trained and selected machine learning classifier have not encountered the unidentified user and associated user information before the bid request was received;

in response to receiving the bid request message, determine, based upon the website information and the user information of the unidentified user, a plurality of features corresponding to the unidentified user;

compute, based upon the website information and the user information of the unidentified user, a particular feature vector for the unidentified user comprising values of the plurality of features corresponding with the unidentified user;

generate, by the trained and selected machine learning classifier using the computed particular feature vector as input, a confidence value corresponding with a level of confidence in an estimate of whether the unidentified user is a member or a non-member of the predetermined traveler category;

determine, based on the confidence value with respect to a confidence threshold, an estimate of whether the unidentified user is a member or a non-member of the predetermined traveler category;

determine, based on the estimate of whether the unidentified user is a member or a non-member of the predetermined traveler category, a bid decision; and determine, based on the bid decision and the confidence value, a bid amount that correlates to a magnitude of the confidence value.

* * * * *